United States Patent [19]

Severinsky et al.

[11] Patent Number: 4,974,141
[45] Date of Patent: * Nov. 27, 1990

[54] AC TO DC POWER CONVERTER WITH INPUT CURRENT WAVEFORM CONTROL FOR BUCK-BOOST REGUALTION OF OUTPUT

[75] Inventors: Alex Severinsky, Silver Spring; Kaushik Rajashekara, Greenbelt, both of Md.

[73] Assignee: Viteq Corporation, Lanham, Md.

[*] Notice: The portion of the term of this patent subsequent to Oct. 16, 2007 has been disclaimed.

[21] Appl. No.: 394,115

[22] Filed: Aug. 15, 1989

Related U.S. Application Data

[63] Continuation of Ser. No. 195,160, May 18, 1988.

[51] Int. Cl.⁵ .................................... H02M 3/156
[52] U.S. Cl. .................................... 363/81; 323/224; 363/89
[58] Field of Search ............... 363/79, 80, 81, 89; 323/220, 222, 224

[56] References Cited

U.S. PATENT DOCUMENTS

| | | | |
|---|---|---|---|
| 4,384,321 | 5/1983 | Rippel | 363/124 |
| 4,437,146 | 3/1984 | Carpenter | 363/21 |
| 4,591,693 | 5/1986 | Retator | 363/17 |
| 4,618,812 | 10/1986 | Kawakami | 323/266 |
| 4,677,366 | 6/1987 | Wilkinson et al. | 323/222 |
| 4,688,162 | 8/1987 | Mutoh et al. | 363/80 |
| 4,712,169 | 12/1987 | Albach | 323/282 |
| 4,719,552 | 1/1988 | Albach et al. | 323/282 |
| 4,761,725 | 8/1988 | Henze | 363/81 |

FOREIGN PATENT DOCUMENTS

| | | | |
|---|---|---|---|
| 59053 | 9/1982 | European Pat. Off. | 363/80 |

*Primary Examiner*—Willian H. Beha, Jr.
*Attorney, Agent, or Firm*—Banner, Birch, McKie & Beckett

[57] ABSTRACT

An AC to DC power converter comprises an imput filter for filtering the alternating current input and an output filter for filtering and smoothing the direct current power output to a load. The output alternating current of the input filter is rectified and electronically switched by buck and boost switching circuits at a frequency much higher than the frequency of the alternating line current input. The rectified line current is sensed and provided to a control circuit which controls the operation of the buck and boost switching such that the power line current will follow a predetermined reference voltage waveform.

11 Claims, 4 Drawing Sheets

AC TO DC POWER CONVERTER WITH INPUT CURRENT WAVEFORM CONTROL FOR BUCK-BOOST REGUALTION OF OUTPUT

This application is a continuation, of application Ser. No. 195,160, filed May 18, 1988.

BACKGROUND OF THE INVENTION

This invention relates to the field of switching type AC to DC power supply converters and, more particularly, is directed to a method and apparatus for converting an AC voltage and current to a highly stable constant DC voltage such that the current drawn from the power source has a predetermined waveform.

Switching type AC to DC converters are widely used to provide regulated power supply voltages. The voltage bucking type converter represents one example of such a converter. In this type of converter, the input voltage is "bucked" to produce a lower value of output voltage. A simplified example of such a converter is shown in FIG. 1.

The buck converter of FIG. 1 includes switching transistor 1 which receives a positive source of voltage at its collector electrode. The emitter electrode of transistor 1 is connected to choke coil 2 and the cathode end of diode 3. Capacitor 4 serves as a voltage filter for the output voltage at nodes B-C which is supplied to load 5.

When transistor 1 is initially turned on by a control voltage applied to its base electrode, full source voltage appears across choke coil 2 because the initial current flow through the coil is zero. Current flow begins to increase over time and the output voltage at nodes B-C begins to rise. When the output voltage reaches a value slightly above the desired output level, transistor 1 is turned off. The voltage across nodes A-D becomes negative as the magnetic field around choke coil 2 collapses. Thus, diode 3 conducts and the energy which has been stored in coil 2 is dissipated into load 5 through diode 3. As this energy is dissipated, the current flow through coil 2 and the output voltage at nodes B-C begins to decrease. When the output voltage drops to a level slightly below the desired output level, transistor 1 is turned on again and the output voltage begins to rise to begin another cycle.

In order to provide proper and efficient operation of a buck converter, the switching device, i.e., transistor 1 in FIG. 1, must be precisely controlled. Such a control device is set forth in commonly assigned co-pending Application Ser. No. 123,720 filed Nov. 23, 1987 entitled "AC to DC Power Converter With Integrated Current Control", now U.S. Pat. No. 4,816,982, issued Mar. 28, 1989, which is incorporated herein by reference.

The circuit elements of FIG. 1 may also be configurated as a "boost" converter to provide an output voltage which is higher than the source voltage. The operation of a boost converter will be discussed below in connection with Applicants' invention.

The fundamental challenge of power supply design is to simultaneously realize two conflicting objectives: maximizing the electrical delivery performance of the power supply while at the same time achieving a power supply design of low cost. To this end, control circuitry for switching type AC-DC power converters has evolved which includes a pulse width modulation circuit operated at a frequency much higher than that of the alternating current input. The pulse width modulation circuit in turn activates the converter switching device for switching the rectified line current in accordance with an applied pulse width modulated signal. The pulse width modulation circuit is actuated by the result of a comparison of the input voltage waveform and an error signal obtained by subtracting a reference voltage from the voltage delivered to a load of the power supply.

According to the teachings of Pacholok, U.S. Pat. No. 4,472,672, an improved power factor results from forcing the output impedance of such a circuit to appear to be substantially purely resistive. Consequently, while Pacholok is capable of maximizing electrical delivery to a load, he does so at the expense of costly components such as a stepdown center tap transformer for input voltage waveform sensing which make the converter uneconomical for practical application.

Retotar, U.S. Pat. No. 4,591,963, discloses a similar technique to that employed by Pacholok in the sense that the input voltage waveform is sensed and a pulse width modulator is controlled responsive to a means for combining the sensed input voltage waveform and the influences of the output voltage waveform delivered to a load upon a reference voltage. What Retotar adds to the technique disclosed by Pacholok is the application of line current sensing techniques for the purpose of constraining current in an input inductor to be in phase with the input voltage waveform. While line current sensing techniques are appropriate for control of peak current, any improvement in electrical power delivery to a load requires the application of substantially the same input line voltage waveform sensing technique as taught by Pacholok.

One problem with input line voltage waveform sensing techniques has been the inability of the control circuitry to react quickly to transients appearing in the line voltage By the time an input voltage transient is reflected in the load voltage waveform, it is too late for control circuitry to efficiently react.

Nevertheless, the control circuitry itself has evolved to such a state that economical special purpose integrated circuits have been introduced into the marketplace for application with such voltage control techniques. These low cost integrated circuits facilitate the maximization of electrical power delivery at low cost. For example, the Unitrode Corporation UC 3842 integrated circuit includes in a single chip an oscillator, an error amplifier, a PWM latch or flip-flop and current sensing and limiting circuits at its input. At its output, a control signal may be provided for controlling, for example, the switching transistor of a current mode controlled buck regulator. From the perspective of all such known applications, there still remains a requirement to overcome the fundamental challenge presented above of achieving excellent electrical performance at low cost in an AC to DC converter and to improve transient response.

In addition, the ideal AC to DC converter should provide a highly stable output voltage such that the current drawn from the power source has a predetermined waveform. In a commercial AC system, the most desirable output current waveform is a sine wave which is in phase with the voltage waveform in order to provide a unity power factor. Unity power factor offers the most efficient utilization of power line generating capacity. AC to DC converters known in the prior art are not satisfactory in this regard. One such attempt to provide unity power factor in an AC to DC converter is disclosed in an article by Richard Keller entitled "Unity Power Factor Off Line Switching Power Supplies," IEEE publication, pg. 332-339 (1984). In converters of the type disclosed in the Keller article, however, the regulated DC output voltage is always larger than the maximum input peak voltage in the power line. For example, where the input power line voltage is 120 volts, the output voltage will not be less than 200 volts. Such a limitation creates a significant problem when the desired output voltage must be less, e.g., 24, 48 or 100 volts DC. In such cases, an additional DC to DC converter is required in order to reduce the voltage, thereby increasing the expense, size and weight of the power supply.

In addition, the current waveform drawn from the power line is exactly the same as the voltage waveform in the power line. Prior art AC to DC converters do not have the flexibility of producing different waveforms and thus cannot achieve a high power factor without sacrificing other requirements. As pointed out above, another shortcoming of prior art converters is that transient response is poor. A change in input voltage causes a corresponding change in current and output voltage before feedback from the output brings the system back into balance. Such a slow transient response is unacceptable in power supplies which require a highly regulated output.

SUMMARY OF THE INVENTION

It is therefore an overall object of the present invention to provide an AC to DC converter which overcomes the above-noted deficiencies and disadvantages with respect to AC to DC converters known in the prior art.

It is a specific object of the present invention to provide an AC to DC converter which effectively prevents voltage transients, spikes and other excursions from being propagated to the output load device.

It is another specific object of the present invention to provide an AC to DC converter which presents a substantially purely resistive load to the AC power source in order to achieve a high power factor.

It is yet another specific object of the present invention to provide an AC to DC converter which is insensitive to the ratio between the input and output voltage.

It is a further specific object of the present invention to provide an AC to DC converter which can force the input power source waveform to assume a predetermined shape.

It is a further specific object of the present invention to provide an AC to DC converter having the above advantages which is low in cost and economical to manufacture.

These and other objects of the present invention are achieved by controlling the electronic switching operation of the converter in response to input line current rather than input or output voltage. The converter is formed of a buck converter and a boost converter, both of which are independently operated. The buck converter is operated to reduce input voltage to the value of the regulated output voltage when the input voltage is larger than the desired output voltage. When the buck converter is in operation, the boost converter is in an "OFF" state and does not interfere with the operation of the buck converter. When the input voltage is below the regulated output voltage, the boost converter operates to increase the input voltage to the desired regulated output value. When the boost converter is in operation, the buck converter is an "ON" state but does not interfere with the operation of the boost converter.

A reference waveform generator is provided which controls the operation of the buck and boost converters such that the power line current will follow the reference voltage waveform when the input voltage is above and below the desired output voltage.

DETAILED DESCRIPTION

Figure 1:
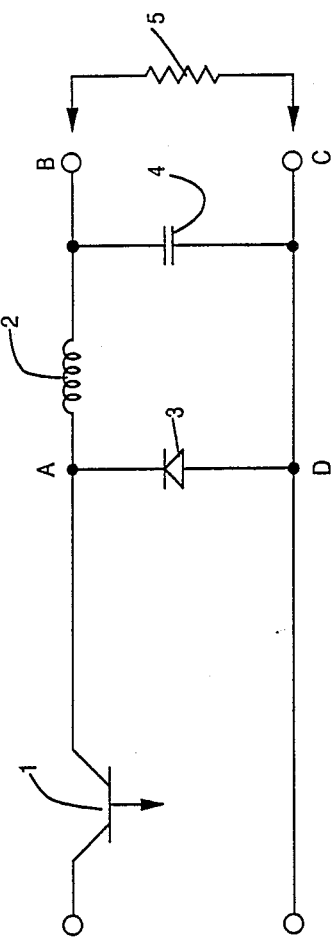
FIG. 1 is a schematic diagram of basic buck converter known in the prior art.
Figure 2:
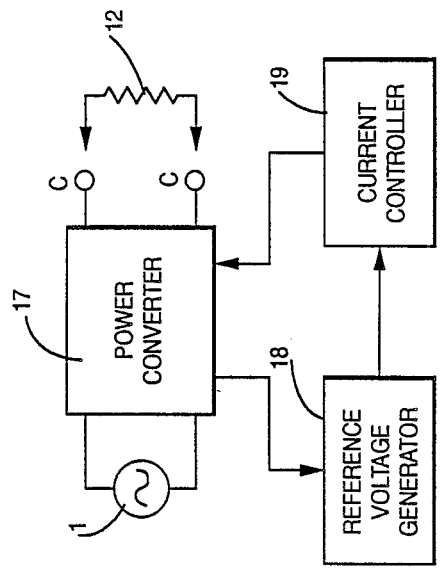
FIG. 2 is a block diagram showing the basic elements of the AC-DC converter of Applicants' invention.

The AC-DC converter of Applicant's invention is formed of a number of component parts as shown in FIG. 2. FIG. 2 is a block diagram showing the major elements or stages of Applicants' invention. The converter is formed of power converter 17 which is powered by AC source 1. The purpose of converter 17 is to convert the AC input voltage to a stable DC output voltage of a predetermined value which is provided to load 12 via output nodes C-C. The operation of converter module 17 is controlled by reference waveform generator 18 and current controller 19 such that the current drawn from source 1 has a predetermined waveform.

Figure 3:
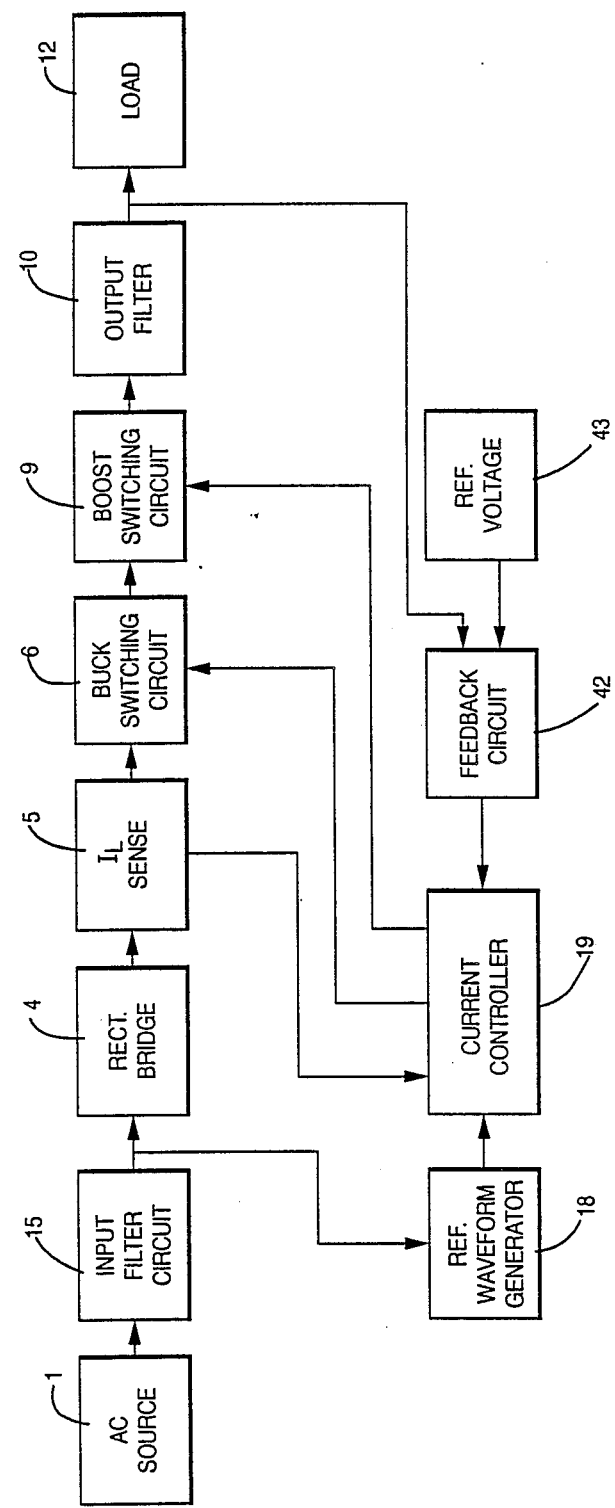
FIG. 3 is a block diagram of one embodiment of the AC-DC converter of Applicants' invention.

Referring to FIG. 3, there is shown a more detailed block diagram of the AC to DC converter in accordance with the present invention connected between the source of alternating current 1 and load 12. In particular, an input filter circuit 15 is coupled to the source 1 of alternating current to smooth the waveform of the current flowing through rectifier bridge 4. Input filter 15 may comprise an L-C lowpass filter with the frequency of the alternating current input, for example, 50 or 60 Hz in the bandpass. Rectifier bridge 4 is provided for converting the alternating current input to a unidirectional current (direct current) and is most conveniently a full wave diode rectifier bridge. Additional filtering is provided by an output filter circuit 16 for delivery of electrical power to load 12.

The rectified line current $I_L$ provided from the source of alternating current 1 is sensed at current sensing circuit 5. Current sensing circuit 5 most conveniently comprises a simple current transformer which has substantially no effect on the amount of power delivered to the load 12. The sensing circuit may additionally comprise a parallel connected resistor, a second diode bridge in parallel with such a resistor or other means for indicating a voltage waveform substantially corresponding to that of the sensed line current.

The rectified voltage from rectifier bridge 4 is provided to buck switching circuit 6 and boost switching circuit 9. These circuits operate to buck and boost the voltage supplied by rectifier bridge 4, respectively. When the buck switching circuit is in an "ON" state, the boost switching circuits is in an "OFF" state. When the boost switching circuit is in an "ON" state, the buck switching circuit is also in an "ON" state. The operation of the buck and boost switching circuits 6 and 9 are controlled by current controller 19.

The output voltage from the buck and boost switching circuits 6 and 9 is filtered by output filter 16 and supplied to load 12. The output voltage is also supplied to feedback circuit 42 along with a reference voltage 43. Feedback circuit 42, reference waveform generator 18 and current sensing circuit 5 provide circuit parameter values which are processed by current controller 19 in order to provide the appropriate control signals to buck switching circuit 6 and boost switching circuit 9.

Figure 4:
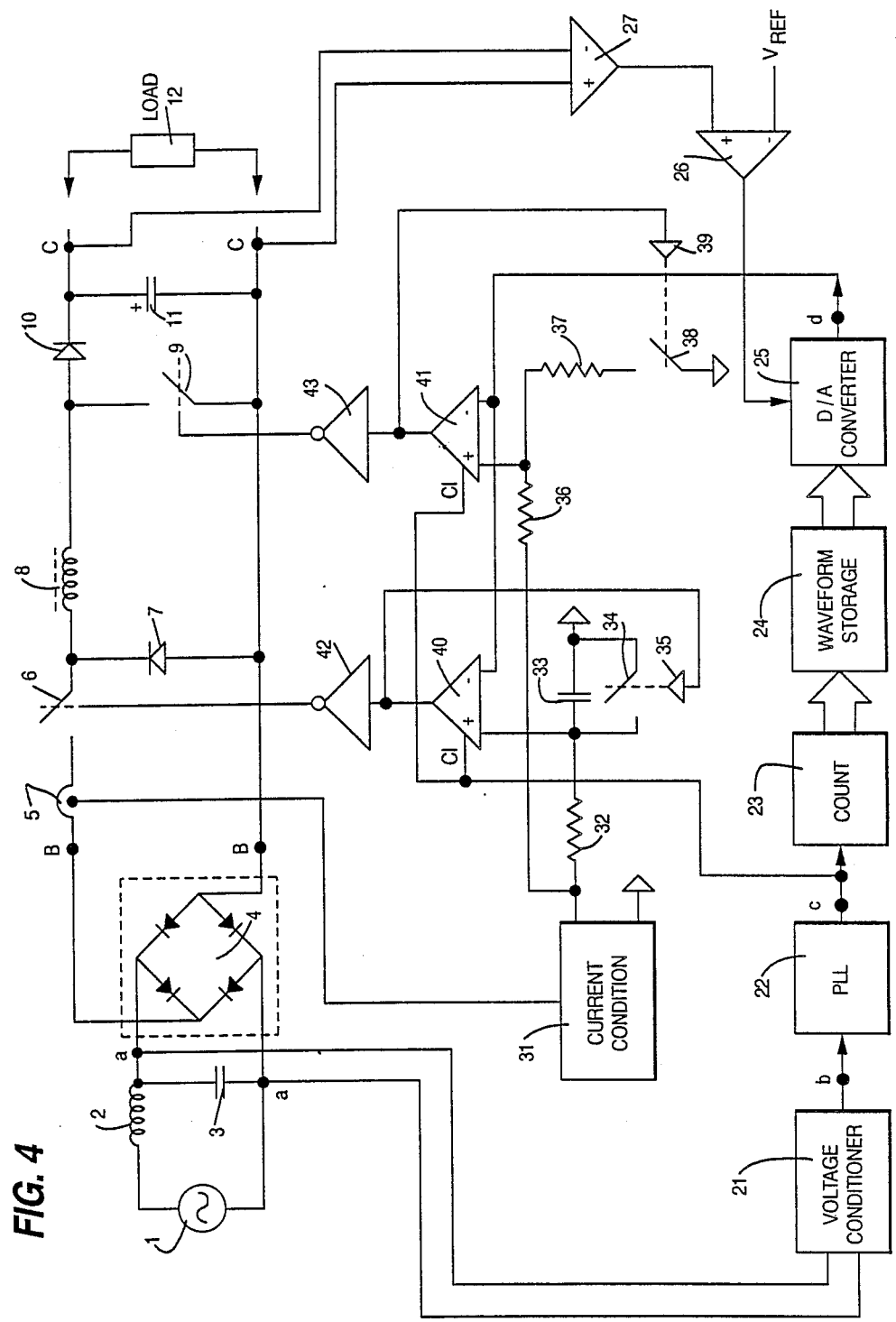
FIG. 4 is a schematic diagram of the AC-DC converter shown in FIG. 3.

FIG. 4 illustrates the construction of the converter in greater detail where the same references number are used to identify similar elements in FIG. 3. As shown in FIG. 4, full wave diode rectifier bridge 4 receives an AC voltage from source 1 via input filter 15 formed of choke coil 2 and capacitor 3. Rectifier bridge 4 rectifies the AC voltage to a unipolar voltage which appears across nodes B—B. The rectified source voltage produces a rectified line current $I_L$ when buck switching circuit 6 is in a conductive state. The level of current $I_L$ is sensed by current detector 5 which, as pointed out above, may be a current transformer or other suitable device which can measure the level of current flow and provide a corresponding output signal.

The on/off state of buck switching circuit 6 is controlled by a signal at its gate electrode as shall be discussed below. When switching circuit 6 is in an "on" or conductive state, current $I_L$ flows through switching circuit 6 to an output filter 16 formed of choke coil 8 and capacitor 11. Diode 7 is provided as a return path for EMF generated by choke coil 8 when switching circuit 6 switches to an off or non-conductive state. The output filter provides a filtered DC voltage across nodes C—C which produces load current flow $I_Z$ through load 12.

The converter also includes boost switching circuit 9. Switching circuits 6 and 9 are driven by drivers $U_2$ and $U_3$ as shall be discussed below.

The reference waveform generator 18 is formed of voltage conditioner 21 which provides a reference signal to phase lock loop (PLL) generator 22. PLL generator 22 feeds counter 23 which addresses digital waveform storage device 24. The output data from device 24 are fed into D/A converter 25. Converter 25 is a multiplying type converter and is also supplied with an error voltage produced by an error amplifier 26. The inputs of amplifier 26 are a reference voltage 43 and a voltage proportional to the output voltage of the converter which is differentially sensed by amplifier 27.

The current controller 19 is formed of current conditioner 31 which receives a signal from current sensor 5 and conditioning it for proper reference level and amplitude. The output signal is supplied in parallel to buck and boost switching circuits 6 and 9. The output signal is supplied to buck switching circuit 6 through a resettable integrator formed of resistor 32, capacitor 33, semiconductor switch 34 and control buffer 35. The signal from capacitor 33 is fed to PWM comparator 40 which derives its reference input from the output of D/A converter 25. The output of comparator 40 is fed to amplifier and level shifter 42 for controlling buck switching circuit 6 and control buffer 35. The output signal current conditioner 31 is also fed to a variable divider formed of resistor 36, resistor 37, semiconductor switch 38 and control buffer 39. The output signal from resistor 37 is fed to PWM comparator 41 which derives its reference from the output of D/A converter 25. The output of comparator 41 is supplied to amplifier and level shifter 43 for controlling boost switching circuit 9 and control buffer 39.

The alternating voltage from power line Vaa (see FIG. a) is conditioned by voltage conditioner 21 for proper reference potential and amplitude compatibility with logic level voltages of 5-20 V without a change in waveform or phase.

Figure 5A:
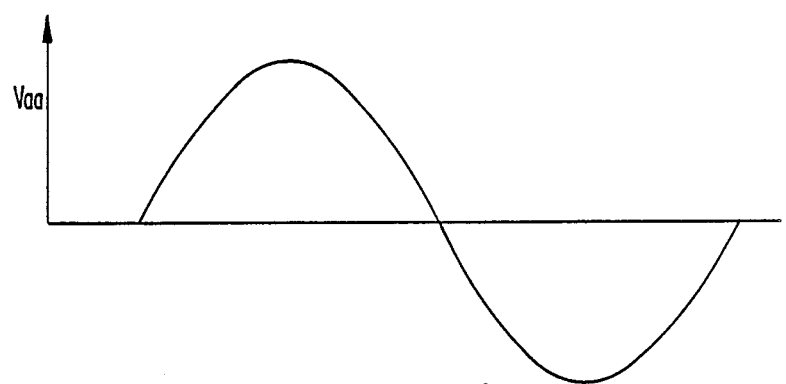
FIGS. 5(a), (b), (c) and (d) show waveforms over time at various points in the AC to DC converter illustrated in FIG. 3.
Figure 5B:
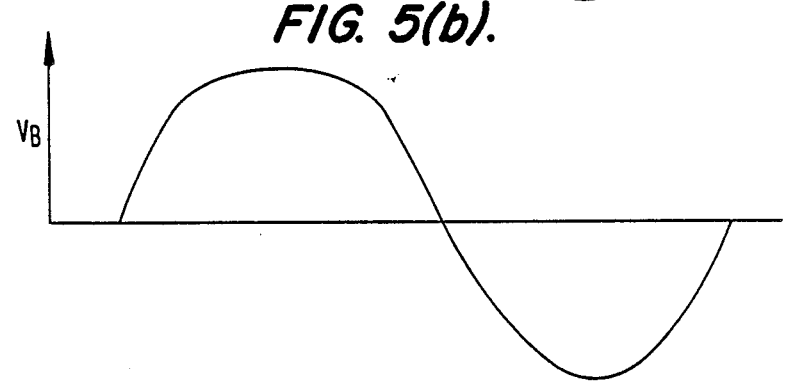
Figure 5C:
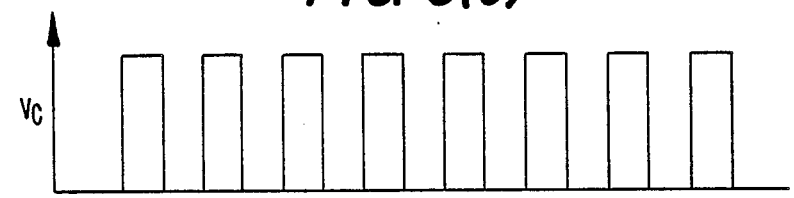
Figure 5D:
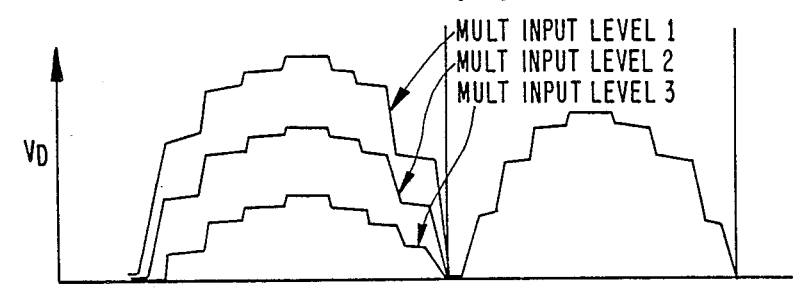

The output of conditioner 21, Vb shown in FIG. 5(b), is fed as input signal to high frequency PLL 22 which provides an output square waveform signal Vc, shown in FIG. 5(c), having a frequency several orders of magnitude larger than the power line frequency, 25 KHz versus 60 Hz for example. The frequency of output signal Vc is proportional to the input frequency and its phase is locked to the input signal zero crossing time. Signal Vc is supplied to counter 23 which outputs digital address data incremented by 1 with each period of the input. The address data is supplied to waveform storage device 24, an EPROM for, example, which stores data in digital form with respect to the amplitude of the reference waveform at the particular count of counter 23. This data is extracted from storage device 24 and is fed to D/A converter 25 at each advance of counter 23. Converter 25 is a multiplying D/A converter in which its output signal is proportional to the product of the analog representation of the data input and the value of the signal on the multiplying input, see FIG. 5(d). This multiplying input is fed from the output of the power converter via amplifiers 26 and 27. If the output voltage changes, increases for example, then the output of the differential amplifier 27 error amplifier 26 decreases which causes the D/A converter waveform amplitude output to decrease as well. The reference voltage at the input of error amplifier 26 causes the output voltage of the converter to be maintained with an accuracy related to the gain of error amplifier 26.

Thus, in accordance with Applicants' invention, waveform generator 18 can produce any waveform stored in digital form. The waveform is synchronized and phased locked to power line frequency and has an amplitude which is inversely variable to the change in the output voltage of the converter.

With respect to current controller 19, current sensor 5 is a transducer of any kind which converts the current, both AC and DC, in a wide frequency range extending at least an order of magnitude to some easily measured voltage on the output. This voltage is conditioned by current conditioner 31 for the proper reference potential and amplitude. The output of current conditioner 31 is fed to the buck and boost current controllers.

The operation of the buck controller is fully described in U.S. Pat. No. 4,816,982 mentioned above. The clock signal for the PWM comparator 40 is derived from the output of PLL generator 22. The buck controller operates when input voltage amplitude Vaa is larger than the output voltage across nodes C—C. If this is not the case, then the voltage on capacitor 33 never exceeds the reference voltage Vd and buck switching circuit 6 is never turned off. The buck converter does not operate and is in an "ON" state for any input voltage below the output converter voltage. When the input voltage exceeds the converter output voltage, the controller operates in such a way that the line current from the power line follows the reference waveform Vd.

The boost controller operates when the input voltage is below the output converter voltage. If the input voltage is above the output voltage, then the current related signal fed to PWM comparator 41 is above reference voltage Vd which holds boost switching circuit 9 in an "OFF" state. This is when the buck converter operates.

When the input voltage is below the output voltage, the buck converter is constantly in an "ON" state and only the boost converter will operate. In this mode, the clock signal from the PLL generator 22 sets the output of the PWM comparator low and boost switching circuit 9, which causes the voltage on the input to PWM comparator 41 to increase and when it reaches the reference voltage Vd, The comparator changes its state and turns off switching circuit 9. In this mode, the power line current will follow the reference voltage waveform at the input of PWM comparator 41.

Thus the input current follows the reference voltage in both cases when the input voltage is above and below the output voltage, and if the reference waveform is sine wave, so will be the input current waveform.

The foregoing embodiment of FIG 4 is intended as an illustration of one application of Applicants' invention. Other modifications and embodiments will be apparent to one skilled in the art without departing from the spirit and scope of the principles of the present invention.

We claim:

1. An AC to DC power converter for converting AC line voltage at an input to a DC voltage at an output; said converter comprising:
   rectifying means for rectifying the input AC voltage;
   first switching means operated at a frequency substantially higher than the frequency of said input AC voltage for controlling the DC voltage delivered to said output;
   second switching means operated at a frequency substantially higher than the frequency of said input AC voltage for controlling the DC voltage delivered to said output;
   current sensing means for sensing the input current;
   reference waveform generating means for generating a predetermined waveform, said reference waveform generating means includes storage means for storing digital data representing said predetermined waveform;
   control means coupled to said current sensing means and said reference waveform generating means for generating an analogue signal for controlling the operation of said first switching circuit and said second switching circuit; said control means including feedback signal means for providing a feedback signal, said feedback signal means being coupled to said DC output and including means for differentiating the voltage at said output to provide a differentiated voltage, said differentiated voltage being compared with a reference voltage of predetermined value to provide said feedback signal, said feedback signal being used to control the generation of said analogue signal.

2. The converter of claim 1 wherein said storage means is addressable by address means for addressing said storage means, said address means being controlled in accordance with the frequency and phase of said input AC voltage.

3. The converter of claim 2 further including frequency control means for providing a frequency corresponding to the frequency of said input AC voltage, said frequency control means being used to control said address means.

4. The converter of claim 1 further including D/A converter means coupled to said storage means for converting the digital data stored in said storage means to said analogue signal, said analogue signal being used to control the operation of said first switching means and said second switching means.

5. The converter of claim 4 wherein said D/A converter means is a multiplying type D/A converter, the output of said D/A converter being scaled in accordance with said feedback signal from said DC output.

6. The converter of claim 5 wherein said control means including integrator means for integrating the sensed input current to provide a control signal which in conjunction with the output of said frequency means and said D/A converter is used to control the operation of said first switching means.

7. The converter of claim 3 wherein said address means is a digital counter.

8. The converter of claim 1 further including filter means for filtering said input AC voltage.

9. The converter of claim 8 further including filter means for filtering the output DC voltage.

10. An AC to DC power converter for converting AC line voltage at an input to a DC voltage at an output; said converter comprising:
    rectifying means for rectifying the input AC voltage;
    first switching means operated at a frequency substantially higher than the frequency of said input AC voltage for controlling the DC voltage delivered to said output;
    second switching means operated at a frequency substantially higher than the frequency of said input AC voltage for controlling the DC voltage delivered to said output;
    current sensing means for sensing the input current;
    reference waveform generating means for generating a predetermined waveform;
    control means coupled to said current sensing means and said reference waveform generating means for controlling the operation of said first switching circuit and said second switching circuit, wherein said control means includes variable divider means coupled to said current sensing means for dividing the sensed input current to provide a control signal which in conjunction with the output of said reference waveform generating means is used to control the operation of said second switching means.

11. An AC to DC power converter for converting AC line voltage at an input to a DC voltage at an output; said converter comprising:
    rectifying means for rectifying the input AC voltage;
    first switching means operated at a frequency substantially higher than the frequency of said input AC voltage for controlling the DC voltage delivered to said output;
    second switching means operated at a frequency substantially higher than the frequency of said input AC voltage for controlling the DC voltage delivered to said output;
    current sensing means for sensing the input current;
    frequency control means for providing a phase locked frequency corresponding to the frequency of said input AC voltage, said frequency control means comprising a phase locked loop;
    reference waveform generating means for self-generating a predetermined waveform at a rate dependent upon the phase locked frequency of the frequency control means, said reference waveform generating means includes storage means for storing digital data representing said predetermined waveform; and control means coupled to said current sensing means and said reference waveform generating means for controlling the operation of said first switching circuit and said second switching circuit.

* * * * *